United States Patent [19]

Okamoto et al.

[11] Patent Number: 4,910,668
[45] Date of Patent: Mar. 20, 1990

[54] ADDRESS CONVERSION APPARATUS

[75] Inventors: Tadashi Okamoto, Hirakata; Hiroshi Kadota, Toyonaka; Masaitsu Nakajima, Hirakata, all of Japan

[73] Assignee: Matsushita Electric Industrial Co., Ltd., Osaka, Japan

[21] Appl. No.: 100,561

[22] Filed: Sep. 24, 1987

[30] Foreign Application Priority Data

Sep. 25, 1986 [JP] Japan .................. 61-226697

[51] Int. Cl.⁴ .............................................. G06F 12/10
[52] U.S. Cl. ................................................ 364/200
[58] Field of Search ........................... 364/200, 900

[56] References Cited

U.S. PATENT DOCUMENTS

| | | | |
|---|---|---|---|
| 4,296,475 | 10/1981 | Nederlof et al. | 364/900 |
| 4,433,389 | 2/1984 | York et al. | 364/900 |
| 4,538,241 | 8/1985 | Levin et al. | 364/900 |
| 4,607,331 | 8/1986 | Goodrich, Jr. et al. | 364/200 |
| 4,785,398 | 11/1988 | Joyce et al. | 364/200 |

Primary Examiner—Gareth D. Shaw
Assistant Examiner—Debra A. Chun
Attorney, Agent, or Firm—Wenderoth, Lind & Ponack

[57] ABSTRACT

An address conversion apparatus includes a content addressable memory for storing a plurality of logical addresses, and a random access memory for storing a plurality of physical addresses corresponding to the logical addresses. When an input logical address is received, a search is conducted to find the same logical address stored in the memory. When the same logical address is found, the content addressable memory causes the random access memory to output a corresponding physical address. The content addressable memory includes a plurality of logical address storage units. Each unit has a plurality of data bit cells for storing address data and a process identification number cell for storing a process identification number. Thereby, a plurality of logical addresses which correspond to different processes are stored in the single content addressable memory.

2 Claims, 8 Drawing Sheets

FIG. 4D

↓ ID1 LOG2

| 1 | 5 | | 1 | ID0 | LOG1 | | PHY1 |
|---|---|---|---|---|---|---|---|
| 1 | 4 | | 1 | ID1 | LOG2 | | PHY2 |
| 1 | 3 | | 1 | ID2 | LOG3 | | PHY3 |
| 1 | 2 | | 1 | ID3 | LOG4 | | PHY4 |
| 1 | 1 | | 1 | ID0 | LOG5 | | PHY5 |
| 1 | 0 | | 1 | ID1 | LOG6 | | PHY6 |
| 0 | 0 | | 0 | — | — | | — |
| 0 | 0 | | 0 | — | — | | — |

FIG. 4E

| 1 | 5 | | 1 | ID0 | LOG1 | | PHY1 |
|---|---|---|---|---|---|---|---|
| 1 | 0 | | 1 | ID1 | LOG2 | | PHY2 |
| 1 | 4 | | 1 | ID2 | LOG3 | | PHY3 |
| 1 | 3 | | 1 | ID3 | LOG4 | | PHY4 |
| 1 | 2 | | 1 | ID0 | LOG5 | | PHY5 |
| 1 | 1 | | 1 | ID1 | LOG6 | | PHY6 |
| 0 | 0 | | 0 | — | — | | — |
| 0 | 0 | | 0 | — | — | | — |

FIG. 4F

| 1 | 7 | | 1 | ID0 | LOG1 | | PHY1 |
|---|---|---|---|---|---|---|---|
| 1 | 2 | | 1 | ID1 | LOG2 | | PHY2 |
| 1 | 6 | | 1 | ID2 | LOG3 | | PHY3 |
| 1 | 5 | | 1 | ID3 | LOG4 | | PHY4 |
| 1 | 4 | | 1 | ID0 | LOG5 | | PHY5 |
| 1 | 3 | | 1 | ID1 | LOG6 | | PHY6 |
| 1 | 1 | | 1 | ID2 | LOG7 | | PHY7 |
| 1 | 0 | | 1 | ID3 | LOG8 | | PHY8 |

ADDRESS CONVERSION APPARATUS

BACKGROUND OF THE INVENTION

This invention relates to an address conversion apparatus used in a computer system employing a microprocessor, and more particularly to an address conversion apparatus capable of efficiently converting from a logical address into a physical address.

In a computer system, the central processing unit outputs a logical address when executing a certain program or a process. Since this logical address merely indicates a virtual address on the program, when actually executing the program, this logical address must be converted into a physical address, that is, the address storing the instruction or data of the memory which stores the content of the practical instruction or data. It is the address conversion apparatus that converts from a logical address into a physical address.

FIG. 5 shows a block diagram of a translation lookaside buffer (TLB) as an address conversion apparatus for converting a logical address into a physical address in the conventional memory management system by paging.

This TLB is composed of a content addressable memory (CAM) 12 for storing the logical address 10 delivered from the CPU, a least recently used circuit (LRU) 14 for controlling the content thereof, and a random access memory (RAM) 18 being accessed by the CAM 12 and delivering a physical address 16. The CAM 12 possesses plural logical address storing parts 20 for storing plural logical addresses. In each logical address storing part 20, a valid bit 22 is provided, and depending on whether the valid bit 22 is 1 or 0, it is known whether the logical address stored in the corresponding logical address storing part 20 is valid (necessary) or invalid (unnecessary). The LRU 14 is composed of a number of least recently used counters 24 corresponding to the plural logical address storing parts 20, and these counters 24 and the logical address storing parts 20 are mutually linked by means of least recently used replace word wires 26 and content addressable memory word wires 28. The CAM 12 and the LRU 14 are joined by way of content addressable memory hit wires 30. The RAM 18 possesses physical address storing parts 32 corresponding to the logical address storing parts 20 of the CAM 12, and the logical address storing parts 20 and the physical address storing parts 32 are linked together by way of random memory access word wires 34.

Usually, when a certain process is executed by a processor, and its logical addresses are converted into physical addresses at a high speed ,by way of the TLB, the operation is effected according to the following procedure.

A certain logical address 10 is fed from the CPU to the CAM 12, and it compared with the logical address stored in the content addressable memory 12. Here, if a logical address coinciding with the input logical address 10 is present, the data corresponding to the physical address stored in the physical address storing part 32 of the RAM 18 corresponding to that logical address is delivered. As a result of this output of the data corresponding to the physical address, the data on that physical address is read out by the CPU or the processor, and is processed.

At the time of the above described logical address retrieval, if no coinciding logical address is present and the content addressable memory 12 is fully filled with the logical address data and it is necessary to delete the logical address data not required for the time being, the least recently used logical address storing part 20 is selected by the LRU 14, and the logical address data storing in that part is erased, and the data of the logical address to be used newly will be stored.

Thus, while a certain process is being executed, the input logical address 10 is converted at high speed by the TLB into an outputted physical address 16, but in the CAM 12 of the TLB, there was not field to recognize the process to be executed. Accordingly, when plural processes, that is, multiprocesses are executed in the processor, if a content switching occurs due to a change-over of the process to be executed, it is necessary to invalidate all data of the logical address newly in each process to update. This is because, even at the same logical address, if the process to be executed is different, the address content differs.

Furthermore, in the multiprocess environment, each process is scheduled, and the processor is used in time sharing, and therefore, in each process, it is necessary to update all logical addresses of the TLB every time changed over by the context switch until the process is completely terminated. Therefore, the system performance was lowered.

SUMMARY OF THE INVENTION

It is hence a primary object of this invention to present an address conversion apparatus capable of converting addresses efficiently even in the environment of frequent context switching.

It is another object of this invention to present an address conversion apparatus comprising a content addressable memory having a field for indicating a process identification number, and capable of storing logical addresses of different processes at the same time.

While the novel features of the invention are set forth in the appended claims, the invention both as to organization and content, will be better understood and appreciated, along with other objects and features thereof, from the following detailed description taken in conjunction with the drawings.

BRIEF DESCRIPTION OF THE DRAWINGS

FIG. 4A to FIG. 4L are diagrams showing the changes of data in address conversion by using the same apparatus.

DETAILED DESCRIPTION OF THE INVENTION

Figure 5:
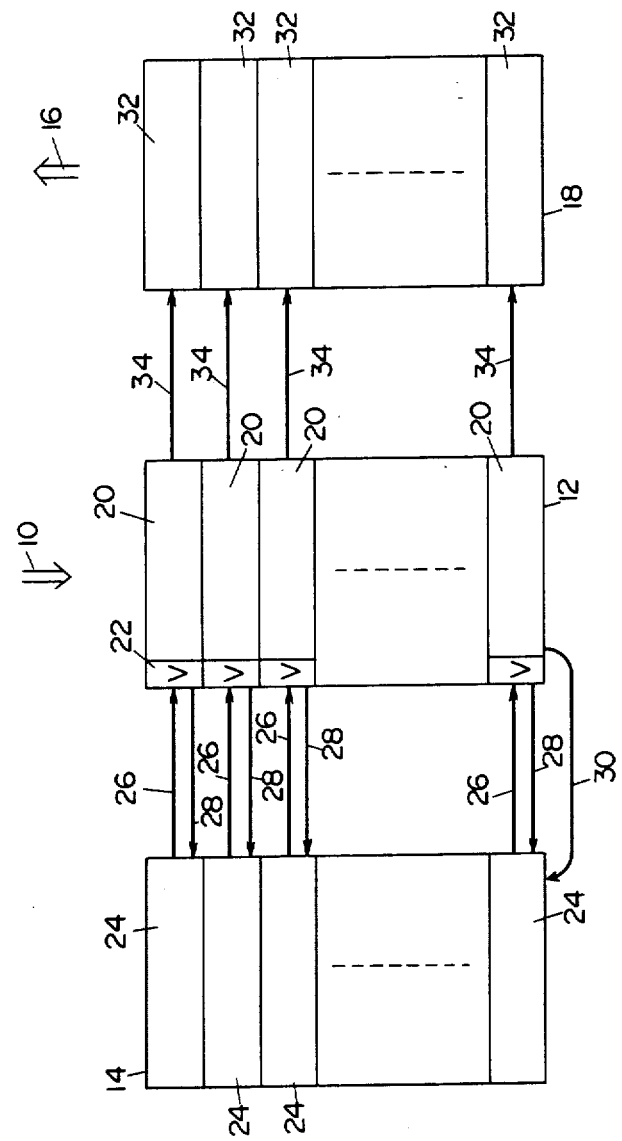
FIG. 5 is a block diagram of a conventional address conversion apparatus.

The address conversion apparatus of this invention is described below while referring to FIG. 1 which shows a translation lookaside buffer (TLB) as one of the embodiments thereof. The TLB shown in this drawing is similar in basic structure to the conventional TLB shown FIG. 5 in and identical parts are given same numerals and detailed descriptions are omitted.

The CAM 12 comprises, at the beginning of each logical address storing part 20 for storing the logical address produced from a certain process being executed by the processor, a process identification number part (process ID part) for storing the identification number of that process, a valid bit 22 for indicating the validity of one word stored in one logical address part, and a priority encoder (PENC) 38 for specifying by selecting a specific invalid word disposed physically at a higher position than the word by referring to the valid bit 22.

Furthermore, the CAM 12 also comprises a batch reset wire 40 for initializing the valid bits by simultaneously resetting all valid bits 22, a process identification number batch reset wire (process ID batch reset wire) 42 for referring to the process ID part 36, and for resetting the valid bit 22 of the plural words having the same unnecessary process identification number (process ID) when the process is unnecessary or when the processes handled by the processor exceed the preset process control number, a priority encoder word wire (PENC word wire) 40 for transmitting the specific word specified by a priority encoder (PENC) 38 to the LRU 14, and a content addressable memory full wire (CAM full wire) 41 for indicating that the CAM 12 is filled with valid data without any invalid word, to the LRU 14.

In the physical address part 32 of the random access memory 18 is stored the address for storing the physical address which stores the data or instruction corresponding to the process identification number of the process ID part 36 on each word of the CAM 12 and the logical address of the logical address storing part 20.

The LRU 14 comprises a counter 24, a counter valid bit 44 to indicate whether the value of this counter 24 is valid, a least recently used batch reset wire 46 for batch-resetting this counter valid bit 44, and a least recently used control circuit 48.

Figure 2:
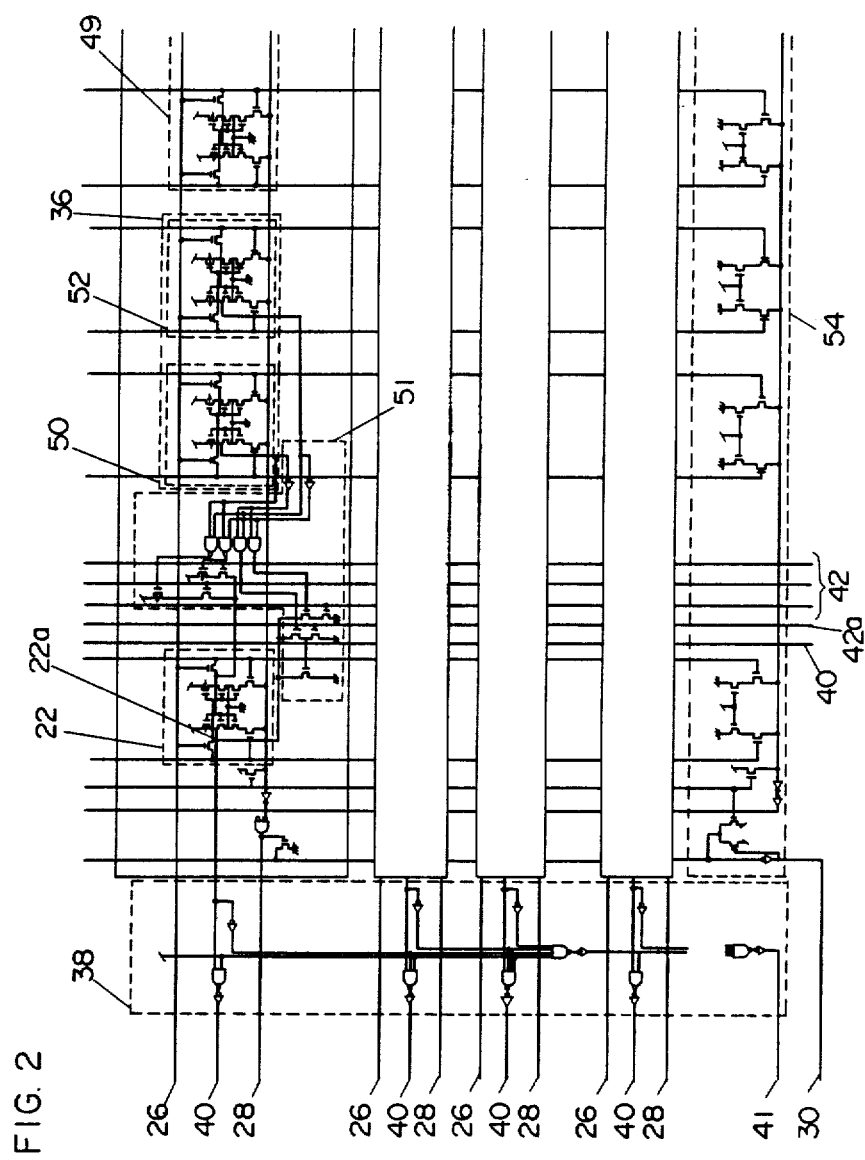
FIG. 2 is a circuit diagram of a content addressable memory in the same apparatus.
Figure 3:
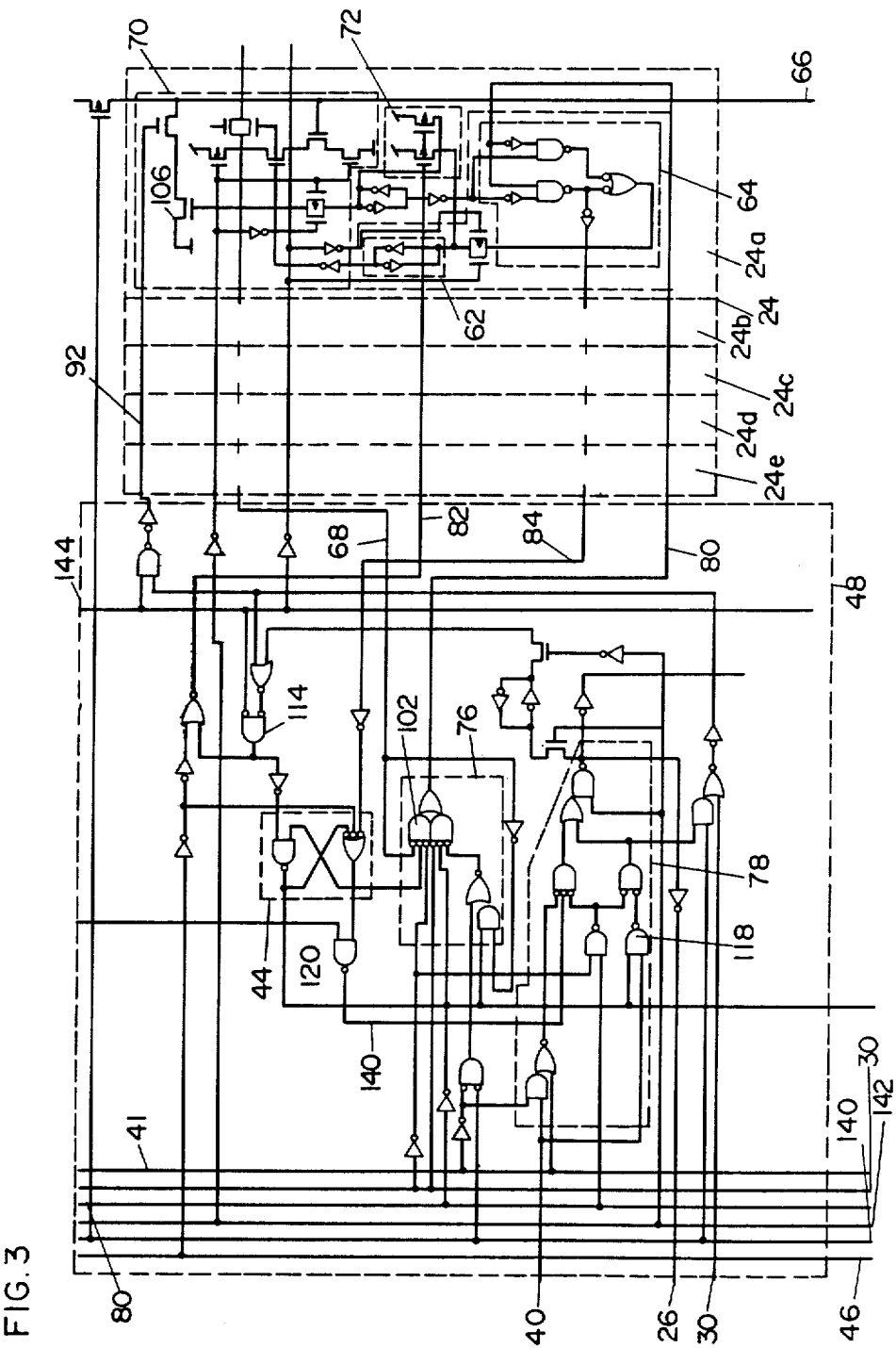
FIG. 3 is a circuit diagram of a least recently used circuit of the same apparatus.

Referring now to FIG. 2 through FIG. 4, the circuit structure of the TLB is described more specifically below, and the operation of the process ID part 36 which is one of the features of this invention during operation of TLB is also explained in detail.

Figure 1:
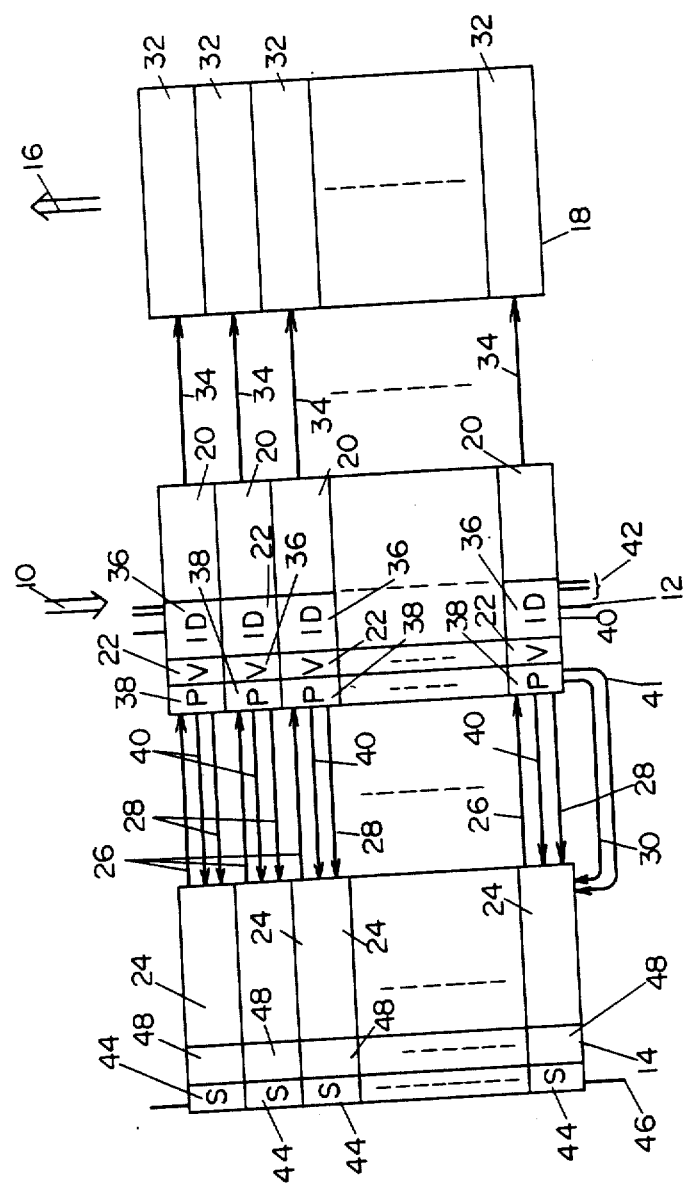
FIG. 1 is a block diagram of an address conversion apparatus according to one of the embodiments of this invention.

FIG. 2 is a circuit diagram specifically illustrating the CAM 12 in FIG. 1. The CAM 12 shown comprises logical address storing parts 20 composed of plural data bit cells 49, and a process ID part 36 for storing, for example, four process IDs 0, 1, 2, 3, and in the process ID part, for example, there are two process identification number cells ($ID_1$, $ID_2$) 50, 52 for setting the four process IDs 0 to 3.

For instance, when the least recent used replace word wire 26 becomes 1 and replacement is effected for storing new logical data, a node 22a is set High, and the valid bit 22 is set at 1. At the same time, the process identification number of the address data and the logical address are entered into process identification number cells ($ID_1$, $ID_2$) 50, 52 and plural data bit cells 49 which make up the logical address storing part 20.

When the process identification number batch reset of this invention is effected, a signal "1" is applied to an arbitrary one of the four process identification batch reset wires 42 to indicate four processes from 0 to 3, for example, the reset wire 42a corresponding to the second process. In the process identification number part 36, the data corresponding to the second process, that is, the data, for example, of which process identification number cell $ID_1$ 50 is "1" and process identification number cell $ID_2$ 52 is "0" outputs a control signal of "1" to the reset circuit 51, and the AND of this control signal and the control signal "1" of said reset wire 42a is obtained in this reset circuit 51, and as a result of this product, the node 22a of the valid bit 22 becomes Low, and that word becomes invalid. This processing is conducted on all words having the same process identification number, and each invalid signal is entered into the priority encoder 38. In the priority encoder 28, with respect to the input of these plural invalid signals, they are indicated to the LRU 14 as being reloadable word regions of logical addresses, sequentially one by one, from the higher ones (the words at higher positions in FIG. 2). Therefore, if the process identification numbers are reset in batch and plural reloadable words should occur in the CAM 12, only the word at the highest position is noticed to the LRU 14 as a reloadable word. At the LRU 14, receiving this notice, when the data of writing logical address is newly entered into the TLB, this new logical address data is written into the word at the highest position, and the priority encoder 38 of the CAM 12 delivers the next word in the priority order as the word at the highest position to the LRU 14.

Furthermore, when the CAM 12 is filled completely with valid data without any invalid word, the nonactive state of the priority encoder 38 is detected, and it is transmitted to the LRU 14 through the CAM full wire 49.

The content addressable memory hit wire 30 is connected to each word, and an indication as to whether each word is hit or not is forwarded to the LRU 14. Numeral 54 is a dummy word part for adjusting the timing of retrieval of the CAM 12.

FIG. 3 shows the portion of the one word of LUR 14 of the TLB. The LRU is roughly divided into the counter part 24 and the other LRU control circuit 38.

The counter part 24 is a 5-bit counter, and each bit (24a to 24e) has a counter data part 62, a carry propagation part 64 for propagating the carry of the counter, a reset part 72 for resetting the counter, and a comparator part 70 for comparing the counter value with other word. The LRU control circuit 48 comprises a counter valid bit 44 to indicate whether the counter of the word is valid, a carry generating part 76 for generating a carry only to the words in which the counter valid bit 44 has been set so far if the comparative word wire 68 becomes active or CAM mishit should occur as the retrieved logical address is not present, and an LRU replace word generating part 78 for making the LRU replace word wire 26 active for the purpose of keeping uniformity of the LRU 14 and CAM 12, RAM 18 by referring to the PENC word wire 40 and CAM full wire 41, and CAM hit wire 30 and replace enable signal 86. Numerals 140, 142, 144 are the clock wires for adjusting the timing.

The LRU control circuit 48, if there is the same as the retrieval logical address in its word and the hit signal from the CAM 12 is entered into the LRU control circuit 48 through the content addressable memory hit word wire 30, transmits the value of the counter of that word to the counter reference bit wires 66a to 66e in each bit 24a to 24e of the counter part 24.

If there is no hit, on the other hand, the value of the counter of other word being hit is received from the counter reference bit wires 66a to 66e, and it is compared with the value of the own counter in the comparator 70, and if the value of the own counter is smaller than the value of this hit counter, the comparative word wire 68 is made active, and this signal is transmitted to the carry generating part 76, and the generated carry is transmitted to the counter part 24 through the carry wire 80, and the value of the counter is incremented by 1.

These actions of the LRU circuit are practically described below. In short, it is intended to prepare for updating the content of the logical address of the word to the content of the logical address of the highest possibility of use, by always recognizing in the TLB the most recently used word, or, in other words, by always recognizing the least recently used word out of N words in the TLB. For this purpose, data of logical addresses are stored in N words in the TLB, and for example, when the data of a certain word is used at the k-th time out of N words, the value of the counter part 24 of the LRU 14 is k. Accordingly, by the next command, if the logical address of this k-th word is used, the counter part 24 of this word is set to 0, and the counters of all words having so far the values of 0 to (k-1) are increased by 1, so that the most recently used word can be always recognized as the counter value becomes 0, or the least recently used word can be recognized as the counter value becomes N.

Meanwhile, the explanation of RAM 18 is omitted because it is a very common one designed to deliver the content to a certain address.

This has been a brief explanation of an embodiment of the TLB of this invention by CAM 12, LRU 14, and RAM 18. Below is described the practical operation of the TLB capable of identifying the process by this invention, mainly relating to the LRU 14.

The circuit action, is explained in FIG. 2, FIG. 3, and data changes of the TLB in action are given in FIG. 4. Here, the TLB is explained as 8 entries (8 words).

When the TLB capable of identifying the process of this invention is operated, two cases are roughly considered.

(1) Ordinary action (not erased by process ID batch reset wire 42, and valid bit 22 of CAM 12 and counter valid bit 44 of LRU 14 are matched).

(2) Extraordinary action (erased by process ID batch reset wire 42, and valid bit 22 of CAM 12 and counter valid bit 44 of LRU 14 are not matched).

These actions are further described below.

(1) Ordinary action

Figure 4A:
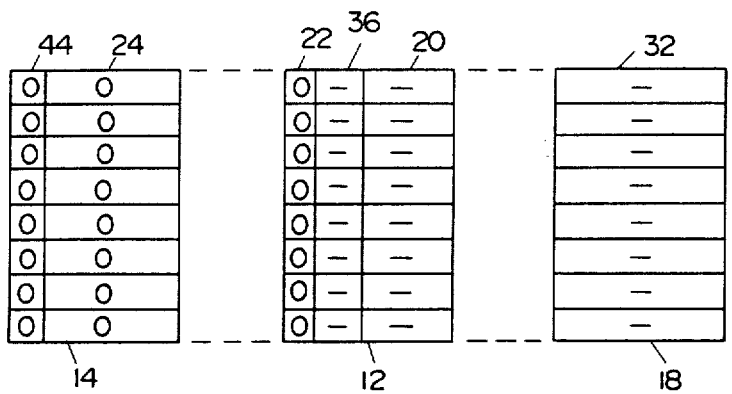
Figure 4B:
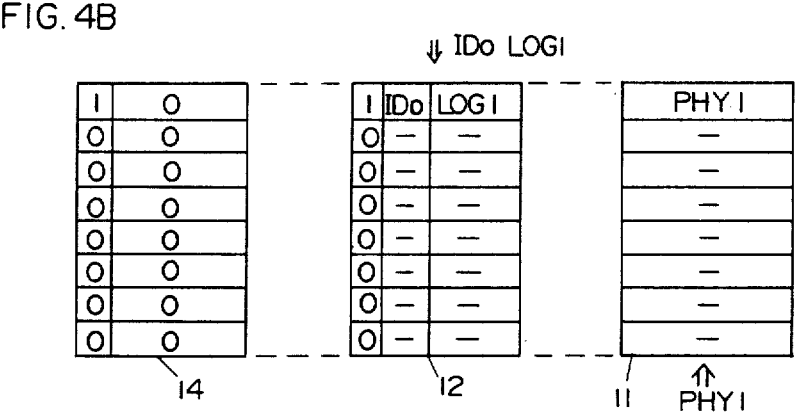
Figure 4C:
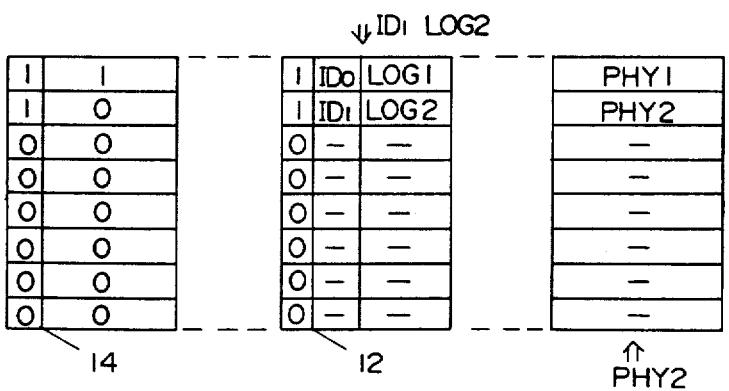

For initialization of the TLB, the batch reset wire 40 for initializing the valid bit 22 is made active in the CAM 12, and the LRU batch reset wire 46 in the LRU, and the value of the counter 24 and the counter bit 44 to see if the counter is effective or not is reset, and the TLB is initialized. At this time, the data holding each element of the TLB becomes as shown in FIG. 4A. The solid line in FIG. 4A shows that the data is present, and 0 of the counter valid bit 44, valid bit 22, and counter part 24 indicates "reset" and the subsequent 1 denotes "set" (valid).

(i) When a new ID and a logical address (ID$_0$, LOG$_1$) get into the CAM 12, since there is no word in which a valid bit 22 is set in the CAM 12, the content addressable memory bit wire 30 becomes inactive, and a mis-hit is transmitted to the LRU circuit 14. At the same time, from the outside the data to be written into the RAM 18 is transferred, and a replace enable signal wire 86 becomes active. Here, at the LRU 14, the LRU replace word wire 26 is made active by the LRU replace word generating part 78 of the word located physically higher as seen from one direction, while the counter valid bit 44 of the same word is set, and as a result of this series of actions, the content of the TLB changes from FIG. 4A to FIG. 4B.

(ii) Furthermore, when a new ID and a logic address (ID$_1$, LOG$_2$) get into the CAM 12, the content addressable memory hit wire 30 becomes inactive again, and the CAM 12 indicates a mis-hit. At this time, the carry generating part 76 of the word in which the address was stored before generates a carry, and the counter is increased by 1, and, the word to be set this time is set in the same process as in i) above as a result of mis-hit, and the logical address is newly stored. At this time, the content of the TLB changes from FIG. 4B to FIG. 4C. When mis-hit is repeated several times, the same operations of i) and ii) are repeated, and the content of TLB becomes as in FIG. 4D.

(iii) Afterwards, suppose the previously stored logical addresses (ID$_1$, LOG$_2$) get in. At this time, the CAM 12 makes the CAM hit wire 30 active, and indicates that the logical address entered into the LRU 14 has been hit. The LRU 14 receives it, and the comparator part 70 of the word which has been hit by the CAM 12 transmits the data of the counter data part 62 to the counter reference bit wires 66. In the other words, the individual counter data parts 62 and the counter reference bit wires 66 are compared, and when the value of the own counter is larger than or equal to the value of the counter reference bit wires 66 to be referred to, the comparative word wire 68 is made active by this comparator part 70, and this signal is transmitted to the carry generating part 76. Receiving this signal, at the carry generating part 76, if the counter valid bit 44 has been set, a carry is generated, and the carry is propagated to the carry propagation part 64 through the carry wire 80. As a result, in the word in which a carry has occurred, the counter is increased by 1 only, but the counter value is not changed in the word having a counter value of larger than the hit word.

As for the counter of the hit word, the reset wire 82 is made active by the logical gate 114, and the value of the counter is cleared. By these actions, when the hit word is the second one from the top, the content of the TLB changes from FIG. 4D to FIG. 4E.

When several of such addresses get in and hit and mis-hit are further repeated, changing from FIG. 4E to FIG. 4F, the TLB is filled up, and the CAM full wire 41 becomes an active state, which is received by the LRU 14.

(iv) In the filled state of the CAM 12 as shown in FIG. 4F, when logical address process IDs not referred red to so far (ID$_2$, LOG$_9$) enter, the CAM 12 transmits the mis-hit to the LRU 14 in the same manner as mentioned above. When a replace signal 86 returns from outside, the LRU 14 generates carries for all words in the logical gate 102 of the carry generating part 76 because the CAM 12 is full. As a result of this carry generation, of all words of the LRU 14, the highest position carry wire 84 of only one word (in this example, the word of which counter of LRU 14 changes from 7 to 8) is made active, and the counter valid bit 44 is temporarily reset, and it is transmitted to the LRU replace word generating part 78, and the LRU replace word wire 26 is made active. At the same time, the counter valid bit 44 is set again. Later, as for the words of which the LRU replace word wire 26 is active, data is written into the CAM 12 and RAM 18. At this time, the content of the TLB changes from FIG. 4F to FIG. 4G.

Figure 4G:
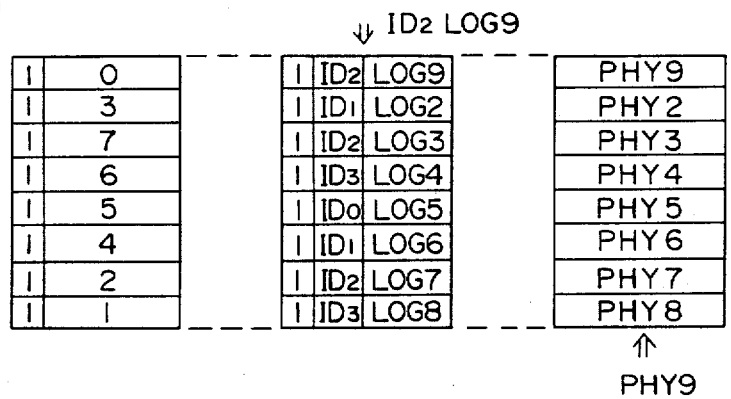
Figure 4H:
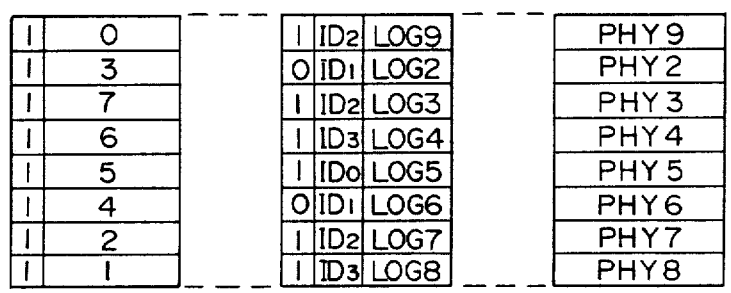
Figure 4J:
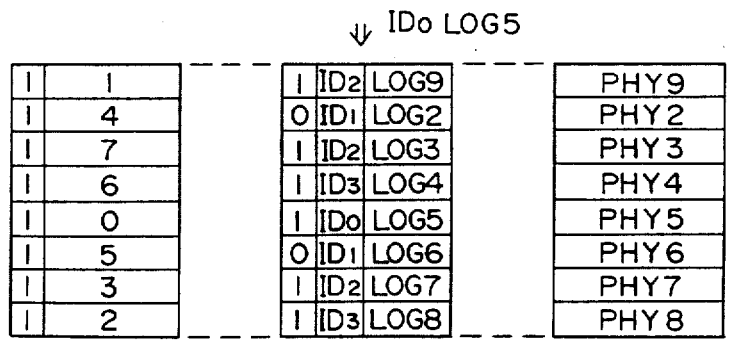

(2) Extraordinary action (i) Of the data stored so far in the TLB, if an unnecessary process should occur, for example, supposing process $ID_1$ is unnecessary, the state changes from FIG. 4G to FIG. 4H by using the circuit for resetting the valid bit of the plural words having the same process ID and the process ID batch reset wire 42. At this time, the reset circuit 51 of the CAM 12 turns on only the transistor connected only to the valid bit 22 having the process ID to be erased, and the valid bit 22 is reset. At this time, the PENC 38 of the CAM 12 makes active and sets only the word located at the highest position as seen from one direction in the physical configuration, out of the words being erased.

Here, suppose the logical address and process ID ($ID_0$, $LOG_5$) to hit get into the CAM 12. At this time, the LRU 14 refers to the CAM hit signal wire 30 and the counter valid bit 44, and since the values of all counters are legal, the operation iv) of the above ordinary action is effected, and the content of the TLB is changed from FIG. 4H to FIG. 4J.

(ii) Finally, in this state, suppose the logical address and process ID ($ID, LOG_{10}$) to mis-hit the CAM get in.

At this time, the PENC 38 of the CAM 12 makes active only the word at the highest position as seen from one direction in the physical configuration, and makes inactive the CAM full wire 41. At this time, the CAM hit wire 30 is inactive.

In this state, the signal of PENC word wire 70 and the value of counter valid bit 12 are entered into the logical gate 118 of the LRU replace word generating part 78. Here, in the word of which value of the counter valid bit 12 is "1" and PENC word wire 40 is active, the output of the logical gate 118 becomes active, and this signal makes active the LRU hit word wire 92. As a result, as mentioned in step iv) of ordinary action, the TLB sets 0 the value of the counter of LRU 14 of the word which has been hit, as if the stored logical address had been hit, and increases the counter value by 1 as for the words requiring increment.

Figure 4K:
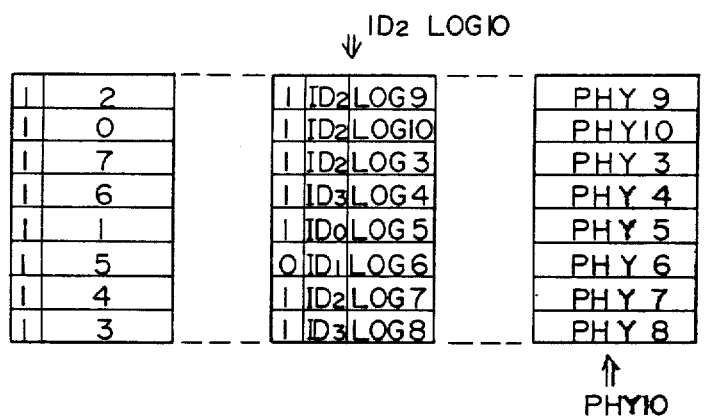
Figure 4L:
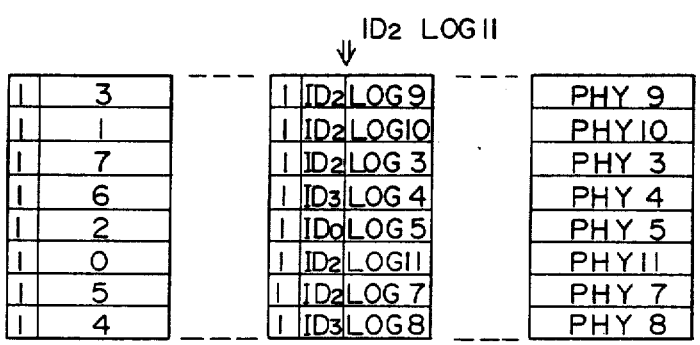

At the same time, different from step iv) of ordinary action, when the LRU replace enable signal 86 returns, the output of the LRU replace word generating part 78, that is, the LRU replace word wire 26 becomes active. By this active LRU replace word wire 26, the data of the CAM 12 and RAM 18 are updated. At this time, the content of the TLB changes as shown in FIG. 4K. Then by repeating such mis-hit, the logical addresses causing mis-hit are stored in the place of the word where the valid bit 22 of CAM 12 is cleared, and the information of the physical addresses to be converted is stored in the process ID, RAM 11, and as the LRU 14 goes on resetting the counter value of the word, the content of the TLB changes from FIG. 4K to FIG. 4L, thereby returning to the ordinary TLB content. Hence, even after occurrence of erasure by the process ID batch reset wire 40, the uniformity of the TLB may be maintained by the operation described above.

By using this TLB, the following effects are expected.

(1) If context switching should occur, it is not necessary to reset the content of TLB.
(2) The data of only the unnecessary processes can be erased.
(3) It is possible to store the data of different processes having an identical physical address into the TLB.

Owing to these effects (1) to (3), it is possible to use a high speed translation lookaside buffer (TLB) very effectively on multiprocesses, so that the processing speed of the processor may be dramatically enhanced.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. An apparatus for converting a logical address outputted by a processor into an equivalent physical address, said apparatus comprising:

a content addressable memory;

a random access memory coupled to said content addressable memory; and, a least recently used circuit coupled to said content addressable memory;

said content addressable memory including a means for providing a hit word indication to the processor, said hit word indication indicating that a corresponding identification number of a process being processed by the processor and a corresponding logical address of said process is stored in said content addressable memory, and further indicating that the equivalent physical address stored in a corresponding word location of said random access memory is accessible;

said content addressable memory further including a means for providing a miss-hit word indication to the processor, said miss-hit word indication indicating the absence of a corresponding identification number and corresponding logical address of said process, and further indicating that the processor is to search a main memory to locate the equivalent physical address of the logical address, wherein the logical address is stored in said content addressable memory at a word location indicated by said least recently used circuit, and wherein the thus located physical address is stored in a corresponding word location of said random access memory;

said content addressable memory further including: a logical address area for storing the logical address of said process in each word location of said content addressable memory; a process identification number storage area for storing the process identification number in each word location of said content addressable memory; a valid bit for providing an indication of the validity of data stored in both said logical address area and said process identification number storage area in each word location of said content addressable memory; a word line for providing a matching word located during a search of said content addressable memory; a content addressable memory bit line for indicating whether said matching word exists in said content addressable memory, and a content addressable memory full line for providing an indication as to whether words in said content addressable memory are used by referring to said valid bit area of each word location of said content addressable memory;

said random access memory including a physical address area for storing the physical address of the main memory to be accessed by said processor;

said least recently used circuit including a counter data area having a reset portion for indicating a sequence of searching and reading of data of each word stored in said least recently used circuit; a valid bit for indicating the validity of data stored in said counter data area, a counter data reference bit line for providing counter data of a matching word when searching said content addressable memory and being commonly connected to the counter data area of each word; a comparator area disposed in each word location for comparing the counter data of the reference bit and the counter data of other words; a carry area disposed in each word for receiving a value stored in said counter data area of each word, and for selectively varying said value by one, and for resetting said counter data area, and a replace word generating area for specifying a word to be input to said content addressable memory in accordance with a carry signal from said carry area;

wherein, when said least recently used circuit determines that there is an absence of a matching word in said content addressable memory on the basis of said content addressable memory bit line, and further determines that said content addressable memory is fully unoccupied on the basis of said content addressable memory full line, the value stored in said counter data area is increased by one, and the valid bit of said counter data area of an unused word is set, and the logical address and process identification number received from the processor and the valid bit corresponding to the unused word are set in said content addressable memory in a corresponding word location, and a physical address located by the processor in said main memory is set in said random access memory in a corresponding word location, wherein, when said least recently used circuit determines that there is an absence of a matching word in said content addressable memory on the basis of said content addressable memory bit line, and further determines that said content addressable memory is fully occupied on the basis of said content addressable memory full line, the value stored in said counter data area and the carry area of each word are simultaneously increased by one, and the logical address and the process identification number received from the processor are set in the corresponding content addressable memory of the replace word generated in accordance with said replace word generating area by using a carry signal generated in said carry unit, and the physical address located by the processor in the main memory is set in the random access memory at a corresponding word location of said random access memory, and wherein, when said least recently used circuit determines that there is a matching word in said content addressable memory on the basis of said content addressable memory bit line, said least recently used circuit receives said word line indicating the matching word from said content addressable memory, and a value of said counter data of a corresponding word is transmitted to each word through the counter data reference bit line, and the value of said counter data of said matching word and the value of the counter data of each other word are compared, and wherein the value of the counter data of a word having a value smaller than that of the counter data of the matching word is increased by one, and the counter data of the matching word is rendered to a value of an initial setting by said reset unit.

2. An apparatus as recited in claim 1, further comprising a priority encoder for selecting one of the words in which said valid bit is absent, and for transmitting the thus selected word to said least recently used circuit, wherein, when there is an absence of a matching word in said content addressable memory, said least recently used circuit inputs the thus selected word specified by said priority encoder.

* * * * *